US008618898B2

(12) United States Patent
Noble et al.

(10) Patent No.: US 8,618,898 B2
(45) Date of Patent: Dec. 31, 2013

(54) SYSTEM FOR TRANSFERRING POWER AND/OR DATA THROUGH A NON-FERROUS SKIN OF A VEHICLE

(75) Inventors: William B. Noble, Santa Monica, CA (US); Kim L. Valenzuela, Beverly Hills, CA (US); Cheryl K. Endo, Agoura Hills, CA (US); James F. Keating, Fort Wayne, IN (US)

(73) Assignee: Raytheon Company, Waltham ( * ) Notice: Subject to any disclaimer, the term of this patent is extended or adjusted under 35 U.S.C. 154(b) by 0 days.

(21) Appl. No.: 13/021,376

(22) Filed: Feb. 4, 2011

(65) Prior Publication Data

US 2012/0200379 A1 Aug. 9, 2012

(51) Int. Cl.

| | |
|---|---|
| ***B60Q 7/00*** | (2006.01) |
| ***B60Q 1/48*** | (2006.01) |
| ***B60Q 1/50*** | (2006.01) |
| ***H01F 7/20*** | (2006.01) |
| ***H01F 7/04*** | (2006.01) |
| ***E04H 6/42*** | (2006.01) |

(52) U.S. Cl.
USPC .......... 335/289; 335/292; 335/295; 116/28 R; 340/473

(58) Field of Classification Search
USPC .......... 335/285–306; 340/471–474; 116/28 R
See application file for complete search history.

(56) References Cited

U.S. PATENT DOCUMENTS

| | | | | |
|---|---|---|---|---|
| 1,715,952 | A | | 6/1929 | Rostron |
| 1,855,155 | A | | 4/1932 | Sampson |
| 2,447,576 | A | | 8/1948 | Gustafson |
| 2,987,702 | A | * | 6/1961 | Yohe ............................ 340/473 |
| 3,292,579 | A | * | 12/1966 | Buchanan ..................... 119/245 |
| 3,622,979 | A | * | 11/1971 | Dickerson ..................... 340/473 |
| 3,634,864 | A | | 1/1972 | Trachtenberg |
| 3,706,882 | A | | 12/1972 | Eby |

(Continued)

FOREIGN PATENT DOCUMENTS

| | | |
|---|---|---|
| EP | 0847099 A1 | 6/1998 |
| EP | 1115174 A2 | 7/2001 |

(Continued)

OTHER PUBLICATIONS

Mesa Systems Co; "Inductive Power/Data Coupling Devices", 3-Channel 12 V DC Power Coupler, [Online] [Downloaded: Dec. 21, 2012],[http://www.mesasystemsco.com/product.php?p=52], viewed previously at least prior to Aug. 10, 2009.

*Primary Examiner* — Alexander Talpalatski
(74) *Attorney, Agent, or Firm* — Pierce Atwood LLP; Joseph M. Maraia

(57) ABSTRACT

A system for transferring power and/or data through a skin of a vehicle includes a first module for disposition on an external surface of the vehicle, a first magnet arrangement attached to the first module, a second module for disposition on an internal surface of the vehicle, and a second magnet arrangement attached to the second module. The first magnet arrangement and the second magnet arrangement are selected to provide sufficient magnetic attraction therebetween to maintain the first module at a fixed position on the external surface of the vehicle by overcoming an air load force when the vehicle is in motion. When the first module and the second module are in registration with each other though the non-ferrous skin, at least one inductive coupling circuit through the non-ferrous skin is formed to provide one or more bidirectional paths therebetween for transfer of data signals, electrical power or both.

25 Claims, 8 Drawing Sheets

(56) References Cited

U.S. PATENT DOCUMENTS

| | | | | | |
|---|---|---|---|---|---|
| 4,049,333 | A | | 9/1977 | Wallace | |
| 4,071,271 | A | | 1/1978 | Bourriéet al. | |
| 4,538,214 | A | * | 8/1985 | Fisher et al. | 362/147 |
| 4,692,770 | A | | 9/1987 | Kadokura | |
| 4,859,982 | A | * | 8/1989 | Seaburg | 340/475 |
| 4,922,799 | A | | 5/1990 | Bartl et al. | |
| 5,080,380 | A | * | 1/1992 | Nakagawa et al. | 279/128 |
| 5,178,453 | A | * | 1/1993 | Runels | 362/398 |
| 5,221,929 | A | | 6/1993 | Ott | |
| 5,357,262 | A | | 10/1994 | Blaese | |
| 5,557,290 | A | | 9/1996 | Watanabe | |
| 5,818,318 | A | * | 10/1998 | Ligthart et al. | 335/295 |
| 5,872,549 | A | | 2/1999 | Huynh et al. | |
| 5,929,718 | A | | 7/1999 | Crosby | |
| 6,015,175 | A | * | 1/2000 | Carruth et al. | 294/65.5 |
| 6,023,631 | A | | 2/2000 | Cartmell et al. | |
| 6,086,125 | A | * | 7/2000 | Kovacs et al. | 294/65.5 |
| 6,285,331 | B1 | | 9/2001 | Jesman et al. | |
| 6,288,684 | B1 | | 9/2001 | Wiggenhorn et al. | |
| 6,471,273 | B1 | * | 10/2002 | Friedrich et al. | 294/65.5 |
| 6,538,544 | B1 | * | 3/2003 | Hardy | 335/285 |
| 6,566,992 | B1 | * | 5/2003 | Vicentelli | 335/306 |
| 7,038,567 | B2 | * | 5/2006 | Vicentelli | 335/306 |
| 7,053,860 | B1 | | 5/2006 | Guo | |
| 7,086,675 | B2 | * | 8/2006 | Jacobs | 294/2 |
| 7,322,621 | B2 | | 1/2008 | Liao | |
| 7,431,470 | B2 | * | 10/2008 | Coleiro | 362/102 |
| 7,726,852 | B2 | * | 6/2010 | Sanoner et al. | 362/398 |
| 2002/0043205 | A1 | * | 4/2002 | Frost | 116/28 R |
| 2009/0261964 | A1 | * | 10/2009 | Trevisi | 340/473 |

FOREIGN PATENT DOCUMENTS

| | | | |
|---|---|---|---|
| EP | 1198023 | A2 | 4/2002 |
| IT | 1275114 | B | 7/1997 |
| JP | 11122023 | A | 4/1999 |
| JP | 2002353707 | A | 12/2002 |
| WO | 9903168 | A1 | 1/1999 |
| WO | 0072405 | A1 | 11/2000 |
| WO | 03079487 | A1 | 9/2003 |

* cited by examiner

SYSTEM FOR TRANSFERRING POWER AND/OR DATA THROUGH A NON-FERROUS SKIN OF A VEHICLE

BACKGROUND

The present disclosure relates generally to a system for quickly and reversibly attaching a device requiring power and data connectivity to a vehicle. Also, the present disclosure discloses a system and a method for aligning, moving and removing a magnetically attached module with respect to an external surface of a non-ferrous vehicle.

Currently, there is a need for reconfigurable vehicle that may be modified in accordance with changing missions. Depending on the desired capabilities, a vehicle may be modified by changing or adding an antenna, sensor, dispenser or weapon mount. In general, additional Radio Frequency (RF) apertures are added to an aircraft both for military missions and civilian missions. These apertures can also support interference testing of co-located communications systems and help determine optimal locations for permanent antennas. In times of need, civilian aircraft or aircraft designed for other purposes is upgraded very quickly with additional communication capabilities in order to put it into service. Speed and the ability to return the aircraft to its unmodified state when the need has passed are both important.

RF apertures for aircraft have relied on using a wire, typically Coax, or a waveguide, to connect the exterior aperture to the electronics inside the aircraft. Capacitive coupling has been employed to couple signals through glass or other non-conductive media, but this technique does not work when the intervening material is conductive.

Antennas and/or other equipment are currently attached to an external surface of an aircraft using different attachment mechanisms. For example, in one attachment mechanism, through holes are drilled into the aircraft skin to mechanically attach antennas and/or other equipment to the external surface of the aircraft (i.e., screwing the antennas to the skin) and to allow wires (i.e., for electrical connections) to pass therethrough. In another attachment mechanism, strong adhesives are used to attach antennas and/or other equipment to the external surface of the aircraft. In such an attachment mechanism, the wires of the antennas and/or other equipment are run over the external surface of the aircraft, passed through existing openings (e.g., doors and/or windows of the aircraft) and held in place using a sticky tape. Alternatively, brackets may be used to hold new antennae and to mount these antennae to some existing feature (e.g., a door), with cables or wires of the antennae passing through a door or window seal of the aircraft. In yet another attachment mechanism, the antennae and/or other equipment are placed in open doorways of the aircraft.

Each attachment mechanism described above has its own drawbacks. For example, skin penetrations or though holes made in the aircraft skin permanently change and may structurally weaken the aircraft. Also, after the removal of equipment/devices from the external surface of the aircraft patching and/or sealing of penetrations on the external surface of the aircraft is required. Such patching and/or sealing of the external surface of the aircraft weakens the aircraft skin and makes the aircraft skin more susceptible to corrosion and fatigue. Further, the process of drilling holes in the aircraft skin is too slow. Therefore, it is not possible to return aircraft to the original operator in an unmodified state, and may typically include significant delay. There may be aerodynamic drag and reduced performance due to brackets and/or the sticky tape (used to attach equipment/device on the external surface). Strong adhesives or glue damages paint on the aircraft, and removal can distort the aircraft skin. In some instances, when strong adhesives or glue is used, refinishing of the aircraft may be required. Also, there may be a risk of separation of antenna from the aircraft due to failure of the adhesive. Further, using open doorways of the aircraft may significantly limit operations in the aircraft.

Therefore, the inventors have recognized that it is useful to be able to make desired modification to the aircraft without permanent changes to the aircraft's structure and in a short time frame.

SUMMARY

One embodiment relates to a system for attaching a device to an exterior of a vehicle, subsequently operating the device and transferring electrical power, data signals or both from an interior of the vehicle to the device on the exterior of the vehicle without skin penetrations or damage. The system includes a first module suitable for disposition on an external surface of the vehicle, a first magnet arrangement attached to the first module, a second module suitable for disposition on an internal surface of the vehicle, and a second magnet arrangement attached to the second module. The first magnet arrangement is configured to be adjacent to the external surface of the vehicle and the second magnet arrangement is configured to be adjacent to the internal surface of the vehicle. The first magnet arrangement and the second magnet arrangement are selected in combination to provide sufficient magnetic attraction therebetween to maintain the first module at a fixed position on the external surface of the vehicle by overcoming an air load force when the vehicle is in motion. At least a portion of vehicle skin is made of a non-ferrous material. When the first module and the second module are in registration with each other though the non-ferrous skin, at least one inductive coupling circuit through the non-ferrous skin is formed to provide one or more bidirectional paths therebetween for transfer of data signals, electrical power or both.

Another embodiment relates to a method for aligning, moving and removing a magnetically attached module with respect to an external surface of a non-ferrous vehicle. The method includes providing a cushion of air between a bottom surface of the magnetically attached module and the external surface of the vehicle to reduce magnetic force and thereby separate the magnetically attached module from the vehicle, and using the cushion of air to move and position the magnetically attached module at a desired location on the external surface of the vehicle without damaging the external surface of the vehicle.

Yet another embodiment relates to a system for attaching a device to an exterior of a vehicle having a non-ferrous skin, subsequently operating the device and transferring electrical power, data or both from an interior of the vehicle to the device on the exterior of the vehicle. The system includes a first module suitable for disposition on an external surface of the vehicle; a first magnet arrangement attached to the first module, the first magnet arrangement configured to be adjacent to the external surface of the vehicle; a second module suitable for disposition on an internal surface of the vehicle; and a second magnet arrangement attached to the second module, the second magnet arrangement configured to be adjacent to the internal surface of the vehicle. The first magnet arrangement and the second magnet arrangement are selected in combination to provide sufficient magnetic attraction therebetween to maintain the first module at a fixed position on the external surface of the vehicle by overcoming an air load force when the vehicle is in motion. At least a portion of vehicle skin is made of a non-ferrous material. When the first module and the second module are in registration with each other though the non-ferrous skin, at least one inductive coupling circuit through the non-ferrous skin is formed to provide a bidirectional signaling path therebetween for transfer of data, electrical power or both. The non-ferrous skin of the vehicle includes a passage arranged to receive a conductor therethrough, the conductor is configured to provide a secondary bidirectional path between the first module and the second module for transfer of data, electrical power or both.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered not drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure provides a method and a system that uses magnetic attraction to attach (or hold) an antenna (or other modules/equipment) to, for example, a fuselage of an aircraft. The system provides magnetic attachment through non-ferrous skin of the aircraft. In one embodiment, the non-ferrous skin, for example, may include a composite material or an aluminum material. The composite materials may include, for example, fiberglass, carbon, graphite, epoxy, phenolic or other impregnated fabric.

The present disclosure allows external equipment installation without any modification to the non-ferrous aircraft. As will be clear from the discussions below, equipment or module is held in place with an arrangement of strong, permanent magnets operating through the non-ferrous skin of the aircraft. Strong magnets and a layer of material with a high coefficient of friction on the antenna or other modular equipment and on the interior of the aircraft are used to hold the antenna in place. Also, as will be clear from the discussions below, the airflow over the external antenna package provides cooling for active electronics included in the external antenna package.

The present disclosure also provides a system that uses inductive coupling (or magnetic coupling) to pass power and/or communication data through a skin of the aircraft (i.e., in lieu of wires on surface or skin penetrations). That is, the system provides inductive coupling of power and data in an airborne environment. In another embodiment, mechanical coupling or capacitive coupling may be employed to pass power and/or communication data through the skin of the aircraft.

The present disclosure also provides a method and a system that uses a cushion of air to provide a low friction environment to move and position (i.e., allows magnetic field to align) two components of the modular equipment and to allow manual "fine tuning" of location based on measured coupling of inductive devices. For example, the method and system provides air cushion flotation for repositioning and/or removal of any aircraft attachments. In another embodiment, the external antenna package may be released and repositioned by rotating the magnet arrangements, or by providing a lever (or other mechanism) to separate the internal and external magnet arrangement from each other.

Figure 1:
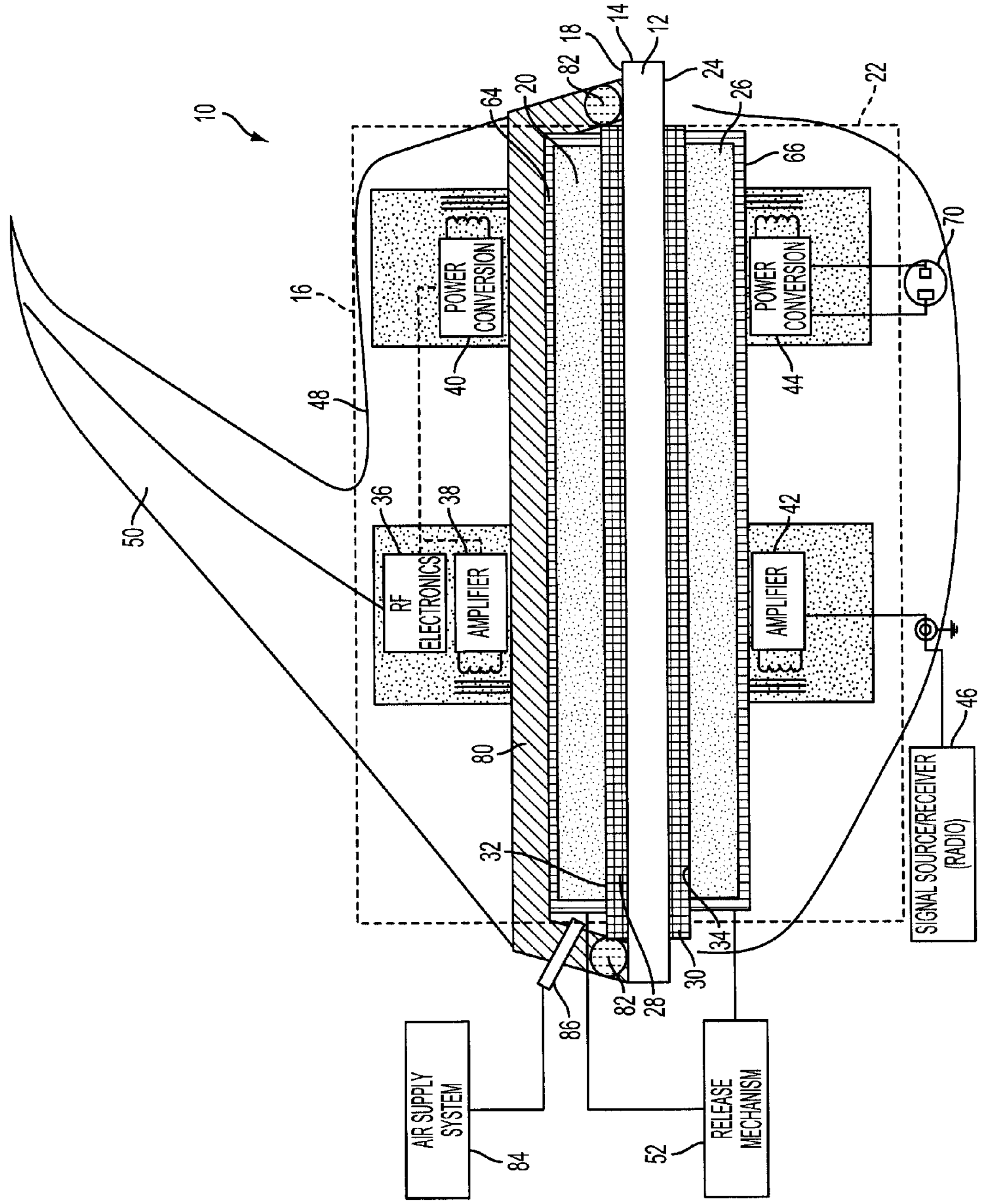
FIG. 1 illustrates a system for transferring power and/or communication data through a non-ferrous skin of a vehicle in accordance with an embodiment of the present disclosure.

FIG. 1 illustrates system 10 for transferring power and/or communication data through non-ferrous skin 12 of vehicle 14 in accordance with an embodiment. System 10 is configured for attaching a device to an exterior of vehicle 14, subsequently operating the device and transferring power and data from an interior of vehicle 14 to the device on the exterior of vehicle 14 without skin penetrations or damage. System 10 includes first module 16 suitable for disposition on external surface 18 of vehicle 14, first magnet arrangement 20 attached to first module 16, second module 22 suitable for disposition on internal surface 24 of vehicle 14, and second magnet arrangement 26 attached to second module 22. First magnet arrangement 20 is configured to be adjacent to external surface 18 of vehicle 14 and second magnet arrangement 26 is configured to be adjacent to internal surface 24 of vehicle 14. First magnet arrangement 20 and second magnet arrangement 26 are selected in combination to provide sufficient magnetic attraction therebetween to maintain first module 16 at a fixed position on external surface 18 of vehicle 14 by overcoming a predicted air load force when vehicle 14 is in motion. When first module 16 and second module 22 are in registration with each other though non-ferrous skin 12, at least one inductive coupling circuit through non-ferrous skin 12 is formed to provide a signaling path (e.g., a bidirectional signal path) therebetween. The signaling path may include one or more bidirectional paths for transfer of data signals, electrical power or both.

System 10 may be used for various vehicles, including aircraft such as helicopters, airships or airplanes, and also for land (e.g., jeeps, trains, tanks, etc) or marine (e.g., ships, boats, etc) vehicles. In one embodiment, vehicle 14 is an aircraft (such as helicopters, airships or airplanes) that includes a non-ferrous material, e.g., a composite material or an aluminum material. In one embodiment, when vehicle 14 is an aircraft, the thickness of the aircraft skin is about 0.05 to 0.120 inches (0.00127 to 0.00305 m). In another embodiment, vehicle 14 is a land vehicle that includes non-ferrous (e.g., aluminum) material. In yet another embodiment, vehicle 14 is a marine vehicle that includes non-ferrous (e.g., aluminum) material.

Figure 2:
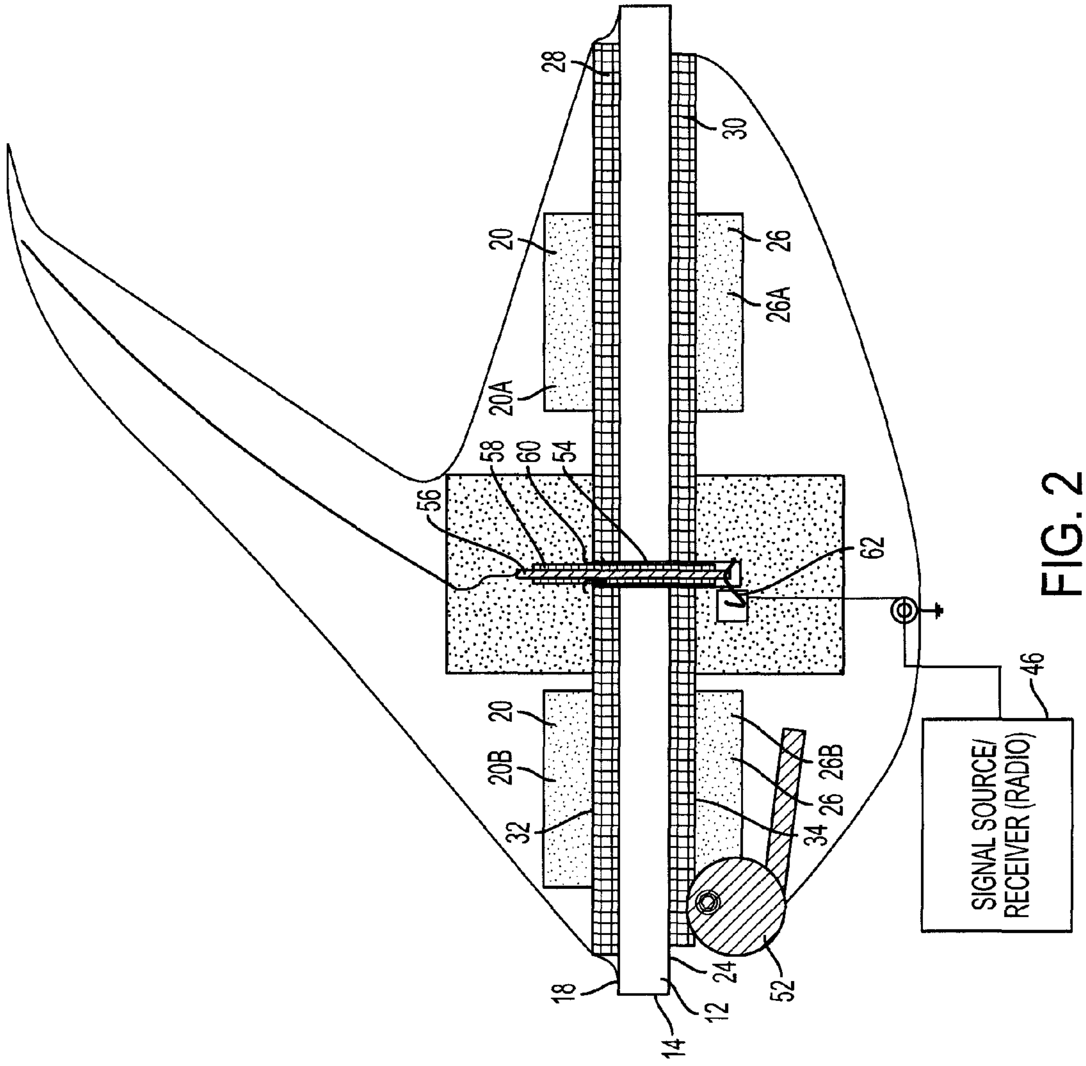
FIG. 2 illustrates a system for transferring power and/or communication data through a non-ferrous skin of a vehicle in accordance with another embodiment of the present disclosure.
Figure 3:
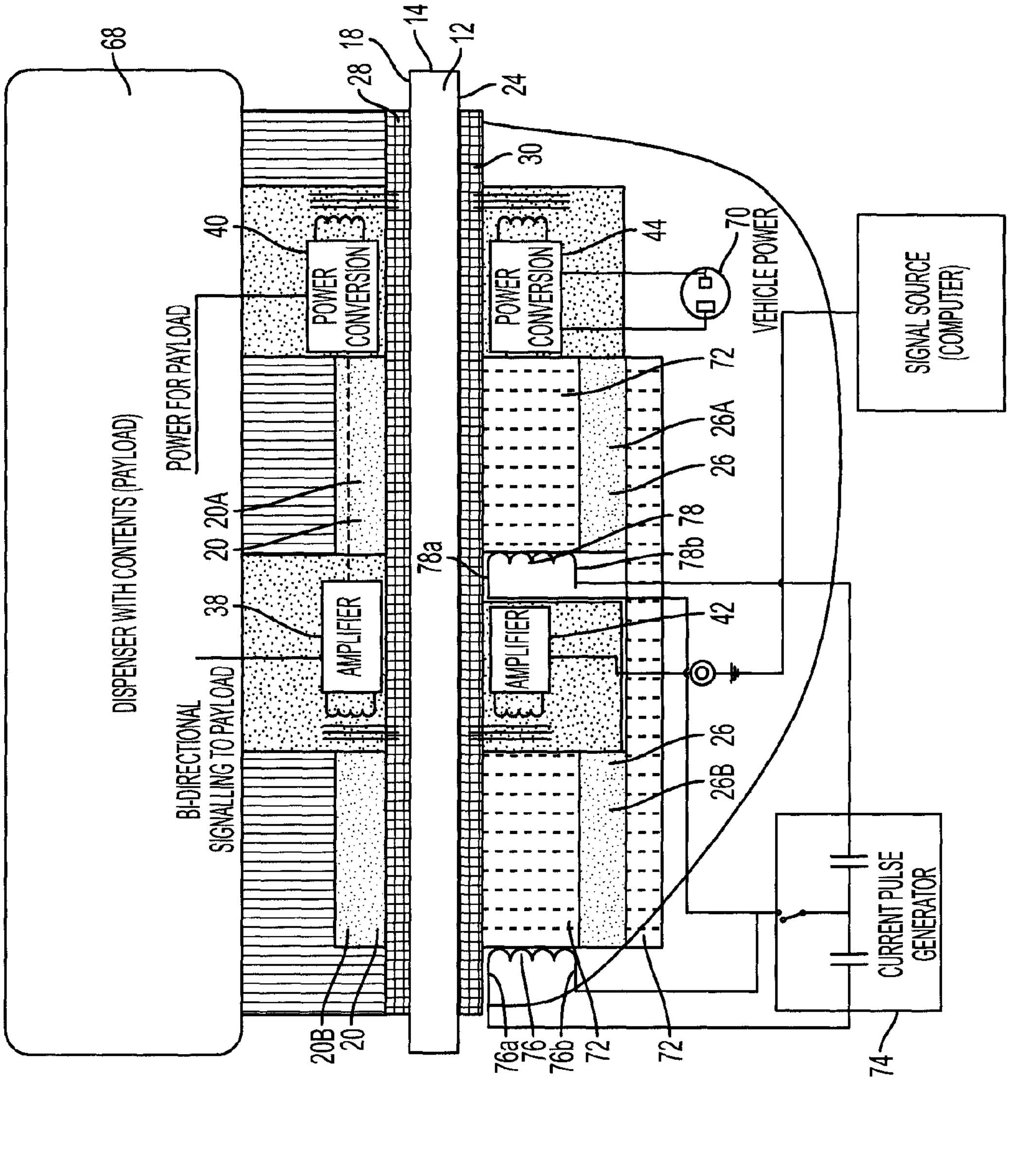
FIG. 3 illustrates a system for transferring power and/or communication data through a non-ferrous skin of a vehicle in accordance with yet another embodiment of the present disclosure.
Figure 8:
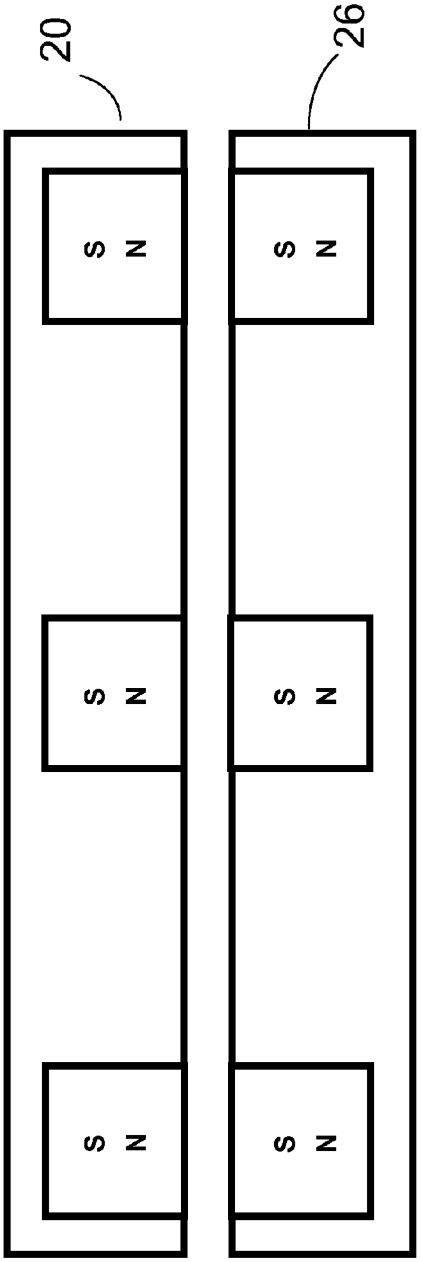
FIGS. 8 and 9 illustrate the system for transferring power and/or communication data through a non-ferrous skin of a vehicle in accordance with an embodiment of the present disclosure, where a plurality of magnet members is arranged such that opposite magnetic poles of adjacent magnet members are facing each other.
Figure 9:
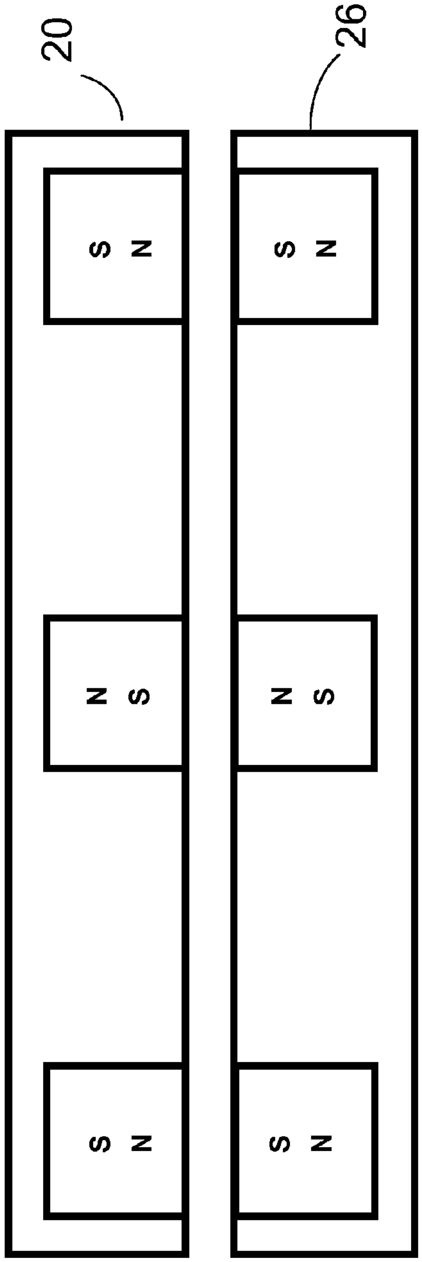

In one embodiment, as shown in FIG. 1, each of first magnet arrangement 20 and second magnet arrangement 26 includes a single magnet member. In another embodiment, as shown in FIGS. 2 and 3, each of first magnet arrangement 20 and second magnet arrangement 26 includes two magnet members (20A and 20B, and 26A and 26B, respectively). That is, set of magnets 20A and 20B are placed on antenna assembly or first module 16 and complementary set of magnets 26A and 26B are placed adjacent to internal surface 24 of vehicle 14. In yet another embodiment, each of first magnet arrangement 20 and second magnet arrangement 26 may include a plurality of small magnet members (rather than large magnets) that allow first magnet arrangement 20 and second magnet arrangement 26 to self-align In one embodiment, when each of first magnet arrangement 20 and second magnet arrangement 26 includes a plurality of magnet members, then the plurality of magnet members may be arranged in an alternating manner to receive keepers therebetween. These keepers (received between the magnet members) are configured to enhance the magnetic flux of the magnet members. In one embodiment, as shown in FIG. 9, the plurality of magnet members is arranged such that opposite magnetic poles of adjacent magnet members are facing each other. In another embodiment, as shown in FIG. 8, the plurality of magnet members is arranged such that like magnetic poles of adjacent magnet members are facing each other.

In one embodiment, at least one of first magnet arrangement 20 and second magnet arrangement 26 includes a permanent magnet. In such an embodiment, a keeper may be implemented to enhance the strength of first magnet arrangement 20 and/or second magnet arrangement 26 by directing the magnetic flux. Such keepers are generally known in the art. These keepers are placed across the poles of the permanent magnet arrangement to reduce the overall flux leakage from the permanent magnet arrangement.

In another embodiment, at least one of first magnet arrangement 20 and second magnet arrangement 26 includes ferromagnetic material. In yet another embodiment, at least one of first magnet arrangement 20 and second magnet arrangement 26 includes an electromagnet. In one embodiment, the electromagnet may be used to implement a releasing mechanism.

In one embodiment, one of first magnet arrangement 20 and second magnet arrangement 26 includes a permanent magnet and the other of first magnet arrangement 20 and second magnet arrangement 26 includes ferromagnetic material. In another embodiment, one of first magnet arrangement 20 and second magnet arrangement 26 includes ferromagnetic material and the other of first magnet arrangement 20 and second magnet arrangement 26 includes an electromagnet. For example, in dispenser/payload approach (as shown in and explained with respect to FIG. 3), the magnet arrangement that includes ferromagnetic material may be used on the exterior of the vehicle, and magnet arrangement that includes an electromagnet may be used in the interior of the vehicle.

In one embodiment, the permanent magnets include Neodymium-Iron-Boron (Nd—Fe—B) magnet although other magnets of sufficient strength may be used. In another embodiment, first magnet arrangement 20 and second magnet arrangement 26 include samarium-cobalt (SmCo) magnets.

First magnet arrangement 20 and second magnet arrangement 26 are selected in combination to provide sufficient magnetic attraction therebetween to maintain first module 16 at a fixed position on external surface 18 of vehicle 14 by overcoming an air load force when vehicle 14 is in motion. In one embodiment, magnet arrangements 20 and 26 are selected such that magnet arrangements 20 and 26 are capable of resisting an air load force of approximately 1000 lbs. In one embodiment, magnet strength or attraction of magnet arrangements 20 and 26 is selected to be at least equivalent to a fastener strength typically used in antenna attachment. For example, an antenna base plate using eight fasteners experiences about 1000 lbs of air load force. Therefore, in one embodiment, the quick mount antenna is designed to withstand at least an air load force of 1000 lbs.

It is known to those skilled in the art that the force between a set of magnets is dependent on several factors such as the shape of the magnet, the type of the magnet, and number of magnets, whether a keeper is used, and/or other variables. The most basic equation for calculating force between two magnetic poles takes into account intrinsic properties of the arrangement such as the magnitudes of the magnetic poles and permeability of the medium separating the magnets. In this basic equation, the force is inversely proportional to the magnet separation squared.

Figure 4:
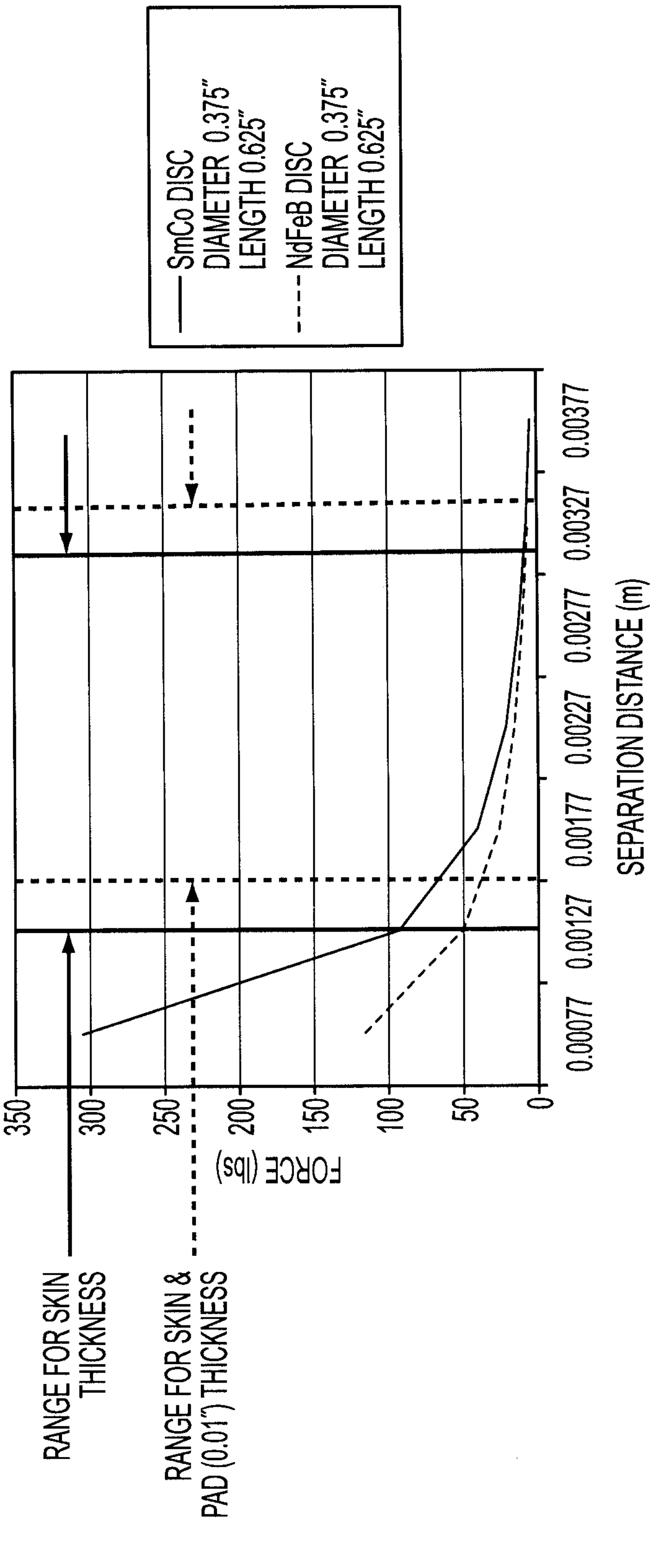
FIG. 4 is a graph showing the results of a comparison study that was performed to determine the effect of magnet material on the magnet strength in accordance with embodiment of the present disclosure.

A comparison study was performed to determine the effect of magnetic material on the magnet strength. The comparison study considered two different magnetic materials (i.e., NdFeB magnet and SmCo magnet) having same size (i.e., 0.375 inch diameter and 0.625 inch length). The results of this comparison study are illustrated in the graph shown in FIG. 4 which shows a comparison of strengths of NdFeB magnets and SmCo magnets when a) aircraft skin thickness was considered and b) thickness of aircraft skin and of non-slip pad (e.g., 0.01 inch) were considered. In both the cases, NdFeB magnet exhibited strong attraction or the greatest strength. In the graph of FIG. 4, the Y-axis represents the magnetic force in pounds (lbs), and the X-axis represents separation distance in meters (m). The graph of FIG. 4 also shows s range of a) aircraft skin thickness and b) thickness of aircraft skin and of a non-slip pad (e.g., 0.01 inch). In one embodiment, approximately three times the number of fasteners are needed to produce sufficient magnetic force.

Figure 5:
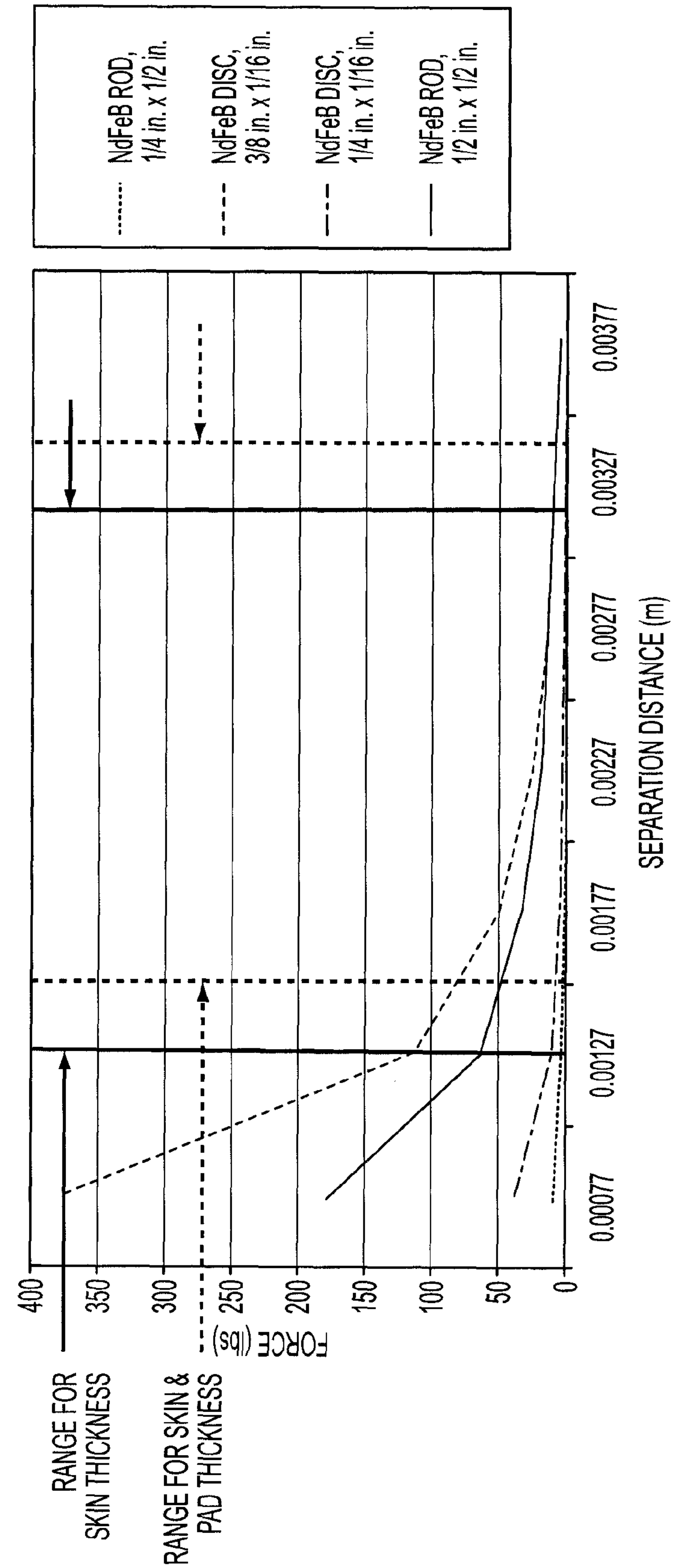
FIG. 5 is a graph showing the results of a comparison study that was performed to determine the effect of size of magnet on the magnet strength in accordance with embodiment of the present disclosure.
Figure 6:
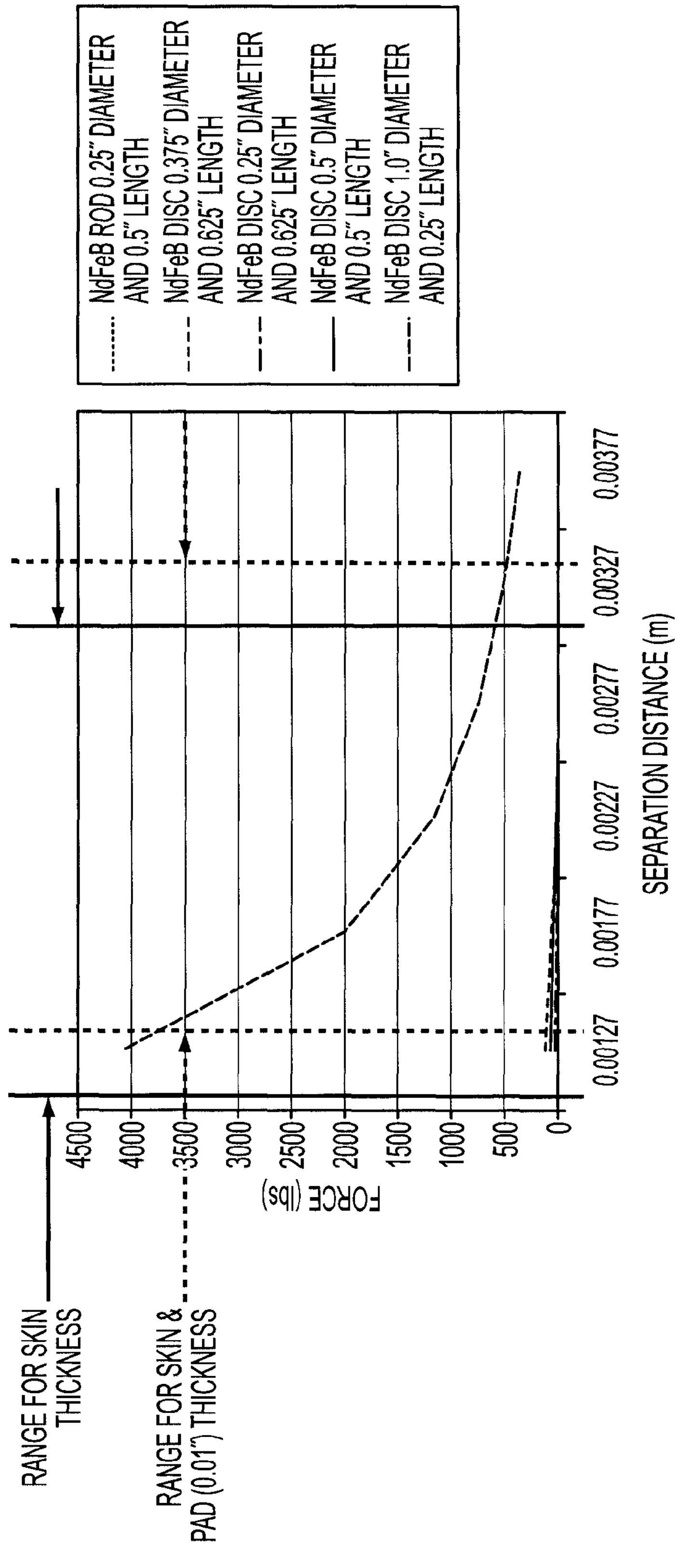
FIG. 6 is a graph showing the results of another comparison study that was performed to determine the effect of size of magnet on the magnet strength in accordance with embodiment of the present disclosure.

Two comparison studies were performed to determine the effect of magnet size on the magnetic strength. Two studies considered different samples of NdFeB magnets, each having a different size. For example, in the first study, a NdFeB magnet rod having 0.25 inch diameter and 0.5 inch length; a NdFeB disc having 0.375 inch diameter and 0625 inch length; a NdFeB disc having 0.25 inch diameter and 0625 inch length; and a NdFeB magnet rod having 0.5 inch diameter and 0.5 inch length were compared. In the second study, a NdFeB magnet rod having 0.25 inch diameter and 0.5 inch length; a NdFeB disc having 0.375 inch diameter and 0625 inch length; a NdFeB disc having 0.25 inch diameter and 0625 inch length; a NdFeB disc having 0.5 inch diameter and 05 inch length; and a NdFeB magnet disc having 1 inch diameter and 0.25 inch length were compared. The results of these comparison studies are illustrated in the graphs shown in FIGS. 5 and 6, respectively. The graphs in FIGS. 5 and 6 show comparisons of strengths of different sized NdFeB magnets when a) aircraft skin thickness was considered and b) thickness of aircraft skin and of non-slip pad (e.g., 0.01 inch) were considered. In both studies, the NdFeB magnet with the largest diameter exhibited strong attraction or the greatest strength. That is, a NdFeB magnet disc having 1 inch diameter and 0.25 inch length exhibited stronger attraction and greater strength. In the graphs of FIGS. 5 and 6, the Y-axis represents the magnetic force in pounds (lbs), and the X-axis represents separation distance in meters (m). The graphs of FIGS. 5 and 6 also show a range of a) aircraft skin thickness and b) thickness of aircraft skin and of the non-slip pad (e.g., 0.01 inch).

Referring back to FIG. 1, in one embodiment, magnet arrangements 20 and 26 are shielded using shield members 64 and 66, respectively, to prevent magnetic flux leakage. In one embodiment, each shield member 64 or 66 includes a steel casing. In one embodiment, magnet member(s) of magnet arrangements 20 and 26 may be coated so as to prevent corrosion.

System 10 also includes first non-slip pad member 28 and second non-slip pad member 30. First non-slip pad member 28 is disposed between bottom surface 32 of first magnet member 20 and external surface 18 of vehicle 14 to provide an improved coefficient of friction therebetween. The improved coefficient of friction (between first magnet member 20 and external surface 18 of vehicle 14) in combination with magnetic attraction (between first magnet member 20 and second magnet member 26) maintains first module 16 at the fixed position on external surface 18 of vehicle 14 by overcoming an air load force when vehicle 14 is in motion.

Second non-slip pad member 30 is disposed between bottom surface 34 of second magnet member 26 and internal surface 24 of vehicle 14 to provide an improved coefficient of friction therebetween. The improved coefficient of friction (between second magnet member 26 and internal surface 24 of vehicle 14) in combination with magnetic attraction (between first magnet member 20 and second magnet member 26) maintains second module 22 at a fixed position on internal surface 24 of vehicle 14 when vehicle 14 is in motion.

In one embodiment, non-slip pad members 28 and 30 include a closed cell neoprene material. In addition to provide additional friction, non-slip pad members 28 and 30 may be used to prevent moisture damage and the formation of ice between non-slip pad members 28 and 30 and the vehicle skin. In one embodiment, the total thickness of non-slip pad members 28 and 30 is about 0.05 inches. In one embodiment, non-slip pad members 28 and 30 include two layers. In one embodiment, the thickness of non-slip pad members 28 and 30 is maintained constant. In alternative embodiment, the thickness of non-slip pad members 28 and 30 is reduced to 0.01 inches (0.00025 m) in the contact area of magnet arrangements 20 and 22 to increase the magnetic attraction force between them.

First magnet arrangement 20 adjacent to external surface 18 of vehicle 14 is attached to first module 16 and second magnet arrangement 26 adjacent to internal surface 24 of vehicle 14 is attached to second module 22. First magnet arrangement 20 and second magnet arrangement 26 are attached to first module 16 and second module 22, respectively, in a number of different attachment mechanisms. In one embodiment, magnet arrangements are attached to their respective modules using elastomeric adhesive or glue. In another embodiment, magnet arrangements are attached to their respective modules using fasteners. In yet another embodiment, magnet arrangements are attached to their respective modules using frictional interference fitting (e.g., press fitting) or snap fitting. In yet another embodiment, magnet arrangements are attached to their respective modules using their magnetic force itself.

First module 16 is suitable for disposition on external surface 18 of vehicle 14. Module 16 is accurately positioned on and removed from the vehicle skin without damaging the skin of vehicle 14 or requiring special fixtures or equipment. In one embodiment, system 10 supplies about 1,000 to 2,000 lbs of attractive force to attach module 16 (e.g., an antenna) to external surface 18 of vehicle 14. As will explained in detail below, magnetically attached module 16 is removed and positioned by weakening the magnetic force, for example by rotating the magnet to reduce the magnetic force, or by prying it off with a lever or cam mechanism.

In one embodiment, first module 16 may be an antenna system that includes RF electronics assembly 36, amplifier 38, and power conversion assembly 40. In one embodiment, first module 16 may include an oscillator and a modulator. In one embodiment, depending on desired rate of power and data transfer, frequency, phase or amplitude modulation of the signals may be performed. Antenna system or first module 16 includes radiating element 50 that is configured to transmit RF signals. In one embodiment, radiating element 50 is shaped and constructed to allow for efficient low drag aerodynamic flow over radiating element 50.

Second module 22 is suitable for disposition on internal surface 24 of vehicle 14. In one embodiment, second module 22 includes amplifier 42 and power conversion assembly 44. In one embodiment, second module 22 is connected to signal source or radio receiver 46.

In one embodiment, power conversion assembly 44 of second module 22 is connected and configured to receive power from vehicle power supply unit 70. In one embodiment, power conversion assembly 40 of first module 16 is configured to receive power from power conversion assembly 44 of second module 22 and to supply power to RF electronics assembly 36 and amplifier 38 of first module 16. The received power is used by power amplifier 38 to amplify the received signals. In another embodiment, RF electronics assembly 36 and amplifier 38 are powered by a battery system.

In one embodiment, antenna system or first module 16 on external surface 18 of vehicle 14 receives data signals from an external source (e.g., satellite). These data signals are amplified using amplifier 38. Amplifier 38 is configured to amplify the signal level (of these received data signals) for later use (e.g., by second module 22) without adding unnecessary noise. First module 16 supplies power signals and/or data signals to second module 22, which is magnetically connected to first module 16 via non-ferrous skin 12 of vehicle 14. When first module 16 and second module 22 are in registration (aligned) with each other though non-ferrous skin 12, at least one inductive or magnetic coupling circuit through non-ferrous skin 12 is formed. This inductive or magnetic coupling circuit through non-ferrous skin 12 provides a signaling path between first module 16 and second module 22. The power (electrical) signals and data signals are transferred from first module 16 and second module 22 via this signaling path. In one embodiment, amplifier 38 is configured to boost the signal level to that required for reception by second module 22 on internal surface 24 of vehicle 14. Amplifier 42 of second module 22 is configured to boost the signal level to that required for reception by radio receiver 46 located in the interior of vehicle 14.

In another embodiment, antenna system or first module 16 on external surface 18 of vehicle 14 transmits data signals to an external source (e.g., control unit). In such an embodiment, second module 22 on internal surface 24 of vehicle 14 receives data signals from signal source 46 located in the interior of vehicle 14. These data signals are amplified using amplifier 42. Amplifier 42 is configured to amplify the signal level (of these received data signals) for later use (e.g., by first module 16) without adding unnecessary noise. In one embodiment, amplifier 42 is configured to boost the signal level to that required for reception by first module 16 on external surface 18 of vehicle 14. Second module 22 supplies power signals and/or data signals to first module 16, which is magnetically connected to second module 22 via non-ferrous skin 12 of vehicle 14. When first module 16 and second module 22 are in registration with each other though non-ferrous skin 12, at least one inductive or magnetic coupling circuit through non-ferrous skin 12 is formed. This inductive or magnetic coupling circuit through non-ferrous skin 12 provides a signaling path between first module 16 and second module 22. The power (electrical) signals and data signals are transferred from first module 16 and second module 22 via this signaling path. Amplifier 38 of first module 22 is configured to boost the signal level to that required for reception by an external source (e.g., control unit). In such embodiment, RF electronics assembly 36 of first module 16 may include a Receiver Transmitter (RT). In one embodiment, the RT may include microprocessors.

Transmitters often operate with short duty factors. When operating at short duty factors, the power requirement of transmitter is much higher than the average power requirement of the radio transmitter. In such an embodiment, a battery in may be placed on first module 16 (i.e., external module) to allow the transmitter to operate for a short time at a power level that exceeds the rate that can be coupled through skin 12 of vehicle 14. That is, the battery is operatively connected to first module 16 so as to operate first module 16 at a peak power level, which is higher than an average power level of first module 16. The battery may be recharged during the interval between transmissions. The battery may be placed on the exterior or the interior of vehicle 14.

The inductive coupling circuit through non-ferrous skin 12 provides a bi-directional signaling path between first module 16 and second module 22. The power (electrical) signals and data signals are transferred from first module 16 and second module 22 via this bi-directional signaling path. That is, the magnetic induction is used to pass power and data signals between the interior and the exterior of vehicle 14. This magnetic induction works in system 10 because skin 12 of vehicle 14 includes, for example, aluminum or composite material that has a low magnetic permeability. In one embodiment, data signals may be transferred between first module 16 and second module 22 by using a direct penetration as shown and explained below with respect to FIG. 2.

In one embodiment, the power (electrical) signals are transferred from first module 16 to second module 22 using acoustic means. That is, the power (electrical) signals are transferred from first module 16 to second module 22 using small deformations of aircraft skin 12. The power is transferred by using a piezoelectric or magnetic transducer located on the interior of skin 12 that is mechanically coupled to a piezoelectric or magnetic transducer located on the exterior of skin 12. The motion of the transducer on the inside is transferred through skin 12 to the transducer on outside. The motion of the outside transducer is then converted back to electrical energy. To avoid fatigue of aircraft skin 12, the motion is maintained below the elastic limit of the material of skin 12. Depending on the material properties of skin 12, energy transferred from first module 16 to second module 22 may be at a frequency in the range of few hundred to a few tens of kilohertz (kHz).

In another embodiment, if a vehicle comprises non-metallic (e.g., composite) material skin, then the power signals may be transferred between first module 16 and second module 22 using capacitive coupling.

In one embodiment, signals that are transferred between interior and exterior of vehicle 14 may be processed by RF electronics assembly 36 (including processing system) located on the exterior of the vehicle. Alternatively, in another embodiment, signals that are transferred between interior and exterior of vehicle 14 may be processed in the interior of vehicle 14 by processing system(s) located in the interior of vehicle 14.

In one embodiment, the frequency of data transfer through an aluminum skinned vehicle is about 10 KHz.

For an aluminum skinned vehicle, power required to run amplifiers may be inductively coupled through the skin but RF signals may not be inductive coupled. Therefore, to inductively couple RF signals through the aluminum skin, low frequency RF signals are first coupled to RF electronics assembly 36 in first module 16 on external surface 18 of vehicle 14. These signals are then used to modulate an RF carrier generated in the antenna system or first module 16 for transmission. A receiver is placed in antenna system or first module 16 to receive the RF carrier signals. The received RF signals are used to generate a low frequency demodulated signal that is inductively coupled to the inside of vehicle 14.

System 10 may further include a cooling assembly that is configured to cool active electronics of first module 16. In one embodiment, first module 16 is housed in aerodynamic fairing 48 that has low aerodynamic drag. Aerodynamic fairing 48 includes a heat conductive material and is configured to cool active, internal electronics of first module 16. Aerodynamic fairing 48 is substantially flat to minimize aerodynamic drag on first module 16. In one embodiment, radiating element 50 of antenna system or first module 16 is shaped and constructed to allow for cooling of active, internal electronics of first module 16.

System 10 may further include release mechanism 52 configured to cancel out magnetic attraction between first magnet arrangement 20 and second magnet arrangement 26 so as to detach first module 16 and/or second module 22 from vehicle 14.

In one embodiment, release mechanism 52 includes a "bucking" electro-magnet to cancel the magnetic attraction between first magnet arrangement 20 and second magnet arrangement 26 so as to detach first module 16 and/or second module 22 from vehicle 14. In such an embodiment, release mechanism 52 is configured to rotate one of first magnet arrangement 20 and second magnet arrangement 26 to a position in which the one of first magnet arrangement 20 and second magnet arrangement 26 is positioned to repel the other of first magnet arrangement 20 and second magnet arrangement 26. In one embodiment, the lines of force of one of first magnet arrangement 20 and second magnet arrangement 26 are made perpendicular to the lines of force of the other of first magnet arrangement 20 and second magnet arrangement 26 so that the magnetic attraction between first magnet arrangement 20 and second magnet arrangement 26 becomes ineffective.

In another embodiment, as shown in FIG. 2, release mechanism 52 is a lever that is configured to pry backing plate of second magnet arrangement 26 from internal surface 24 of vehicle 14. In one embodiment, release mechanism 52 includes a mechanical cam member that is configured to separate first magnet arrangement 20 from second magnet arrangement 26 so as to detach first module 16 and/or second module 22 from vehicle 14.

System 10 may also be configured to align, move and remove magnetically attached module 16 with respect to external surface 18 of non-ferrous vehicle 14. System 10 may include enclosure 80 secured to external surface 18 of vehicle 14, seal member 82 to ensure a substantially airtight seal between enclosure 80 and vehicle 14, and air supply system 84. Air supply system 84 may be configured to provide a cushion of air between bottom surface 18 of module 16 and external surface 18 of vehicle 14 to reduce the magnetic force of magnetically attached module 16, and thereby separate module 16 from vehicle 14 so as to move and position module 16 at a desired location on external surface 18 of vehicle 14 without damaging external surface 18 of vehicle 14. In one embodiment, the desired location is a location at which a peak in signal strength of the data signals, the electrical power or both is obtained.

The cushion of air provides a low friction environment between module 16 and external surface 18 of vehicle 14 to move and position (i.e., allows magnetic field to align) module 16 on external surface 18 of vehicle 14. The cushion of air allows manual fine tuning of location based on measured coupling of inductive devices.

System 10 for aligning, moving and removing magnetically attached module 16 with respect to external surface 18 of non-ferrous vehicle 14 does not require any specialized equipment (that would not otherwise generally be unavailable near an airplane), does not require any moving parts, and does not add weight to module 16. System 10 for aligning, moving and removing magnetically attached module 16 with respect to external surface 18 of non-ferrous vehicle 14 is simple to use and configured to distribute the force uniformly over the area of module 16 so that no damage is incurred. System 10 for aligning, moving and removing magnetically attached module 16 with respect to external surface 18 of non-ferrous vehicle 14 serves as a testing proxy for permanent antenna systems. In the case of an aircraft application, this system may be used on the ground for a) slidably moving magnetically attached module 16 on external surface 18 of non-ferrous vehicle 14 to a desired position or b) removing magnetically attached module 16 from external surface 18 of non-ferrous vehicle 14.

In one embodiment, enclosure 80 comprises an aluminum material. System 10 uses a cushion of air to separate magnetically attached module 16 and to float magnetically attached module 16 above aircraft skin so that antenna 16 is aligned without marring the skin surface, and with minimal force. The cushion of air is supplied through orifice 86 via pressurized gas. The cushion of air is used to position equipment on external surface 18 of vehicle 14.

Figure 7:
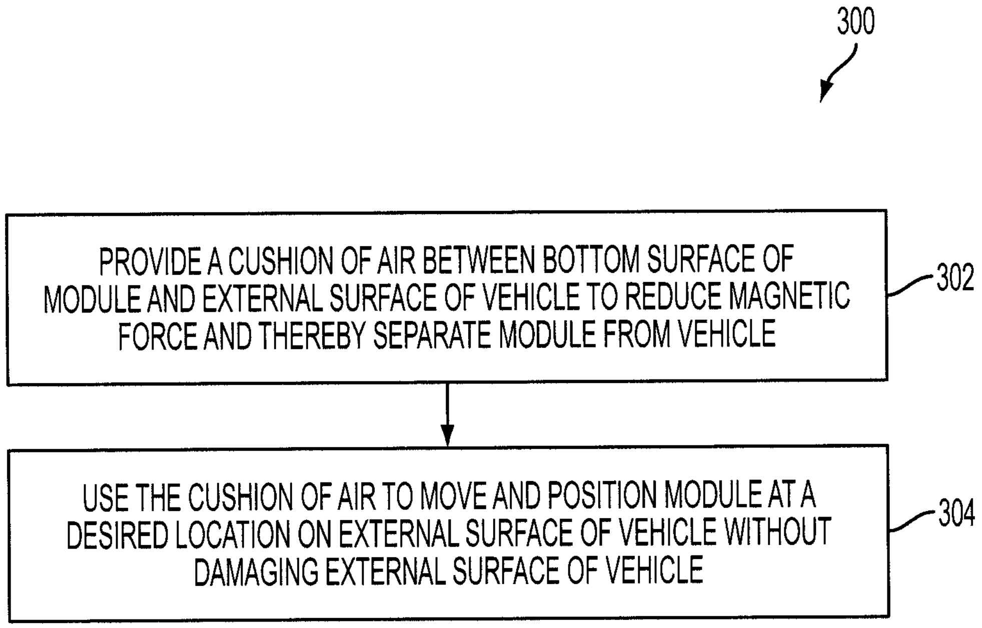
FIG. 7 shows a method for aligning, moving and removing a magnetically attached module with respect to an external surface of a non-ferrous vehicle in accordance with an embodiment of the present disclosure.

In one embodiment, as shown in FIG. 7, method 300 for aligning, moving and removing magnetically attached module 16 with respect to external surface 18 of non-ferrous vehicle 14 is provided. At procedure 302, a cushion of air is provided between bottom surface 32 of module 16 and external surface 18 of vehicle 14 to reduce the magnetic force and thereby separate module 16 from vehicle 14. In one embodiment, the cushion of air is supplied through orifice 86 via pressurized gas. Next at procedure 304, the cushion of air is used to move and position module 14 at a desired location on external surface 18 of vehicle 14 without damaging external surface 18 of vehicle 14. That is, method 300 uses the cushion of air to "float" magnetically attached module 16 on external surface 18 of non-ferrous vehicle 14 until magnetically attached module 16 is aligned to the correct or desired location on external surface 18 of non-ferrous vehicle 14. In one embodiment, the correct or desired location may be determined based on measured coupling of inductive devices. That is, the correct or desired location is a location that allows signals to flow to and from the antenna with sufficient signal strength and minimal interference. The correct or desired location is a location where a peak or desired signal strength (communication data and/or power) to and from the antenna occurs. In another embodiment, method 300 may be applied for aligning, moving and removing magnetically attached module (or second module) 22 with respect to internal surface 24 of vehicle 14.

In one embodiment, an exemplary foot print of magnetically attached module 16 is 4 inches by 8 inches. That is, the surface area of magnetically attached module 16 is 32 square inches. If magnet arrangement 20 of module 16 is attached to vehicle 14 with 1000 pounds (lbs) of force, then an air pressure of 32 psi is needed to move the magnetically attached module 16 on external surface 18 of non-ferrous vehicle 14. For example, the air pressure of 32 psi is roughly equivalent to the air pressure in a car tire.

In one embodiment, the supply of pressurized air is attached to vehicle 14 only when needed. In another embodiment, the supply of pressurized air is permanently attached to vehicle 14.

FIG. 2 illustrates a system for transferring power and/or communication data through a non-ferrous skin of a vehicle in accordance with another embodiment of the present disclosure. This system also attaches equipment (e.g., module 16) to vehicle 14 (with non-ferromagnetic skin 12) by using magnet arrangements 20 and 26 (i.e., without the use of fasteners), where magnet arrangements 20 and 26 are disposed on either side of non-ferromagnetic vehicle skin 12. However, this system differs from the system of FIGS. 1 and 3 in the way it transfers power and/or communication data between interior and exterior of vehicle 14. That is, the system shown in FIG. 2 transfers power and data signals between interior and exterior of non-ferrous vehicle 14 by using a small penetration through non-ferromagnetic vehicle skin 12. This embodiment may be employed for situations where such small penetrations are not of concern and where data transfer at higher rates is desired. For example, the system of FIG. 2 may be used when the data transfer rate exceeds the amount that can be sent through skin 12 (i.e., without penetration) of vehicle 14.

As shown in FIG. 2, the system magnetically couples first magnet arrangement 20 disposed on module 16 (where first magnet arrangement 20 is in contact with external surface 18 of vehicle 14) and second magnet member 26 disposed on module 22 (where second magnet arrangement 26 is in contact with internal surface 18 of vehicle 14) so as to attach module 16 to external surface 18 of non-ferrous vehicle 14. In one embodiment, small penetration 54 is made through non-ferrous skin 12 of vehicle 14. In one embodiment, rigid conductor 56 and insulating sleeve 58 surrounding rigid conductor 56 are inserted into small penetration 54. When insulated sleeve 58 of conductor 56 is no longer in use, sleeve 58 may be trimmed flush with skin 12 of vehicle 14 or left in place for future use. Conductor 56 is configured to provide a secondary bidirectional path between first module 16 and second module 22 for transfer of data, electrical power or both. This secondary bidirectional path is configured to increase data transfer rate between first module 16 and second module 22.

The system shown in FIG. 2 further includes grounding clip 60 that is at least partially inserted into small penetration 54. This system also includes gold plated spring bronze contact finger 62. In another embodiment, wire is held to vehicle 14 with speed tape (in order to eliminate the need for a penetration). Contact finger 62 is configured to be resilient so that at least a portion of contact finger 62 is pressed against a circuit with a certain amount spring force so as to pass signals through penetration 54. The system shown in FIG. 2 does not use some signal processing equipment, such as, for example, amplifiers, and is therefore lighter than the systems disclosed in FIGS. 1 and 3.

FIG. 3 illustrates a system for transferring power and/or communication data through a non-ferrous skin of a vehicle in accordance with yet another embodiment of the present disclosure. The system shown in FIG. 3 is used to attach dispenser with contents (e.g., payload) 68 to external surface 18 of vehicle 14. That is, such dispenser with contents (e.g., payload) 68 is attached to external surface 18 of aircraft 14 before take off and is released (or dropped off) during the flight. Dispenser with contents (e.g., payload) 68 may include weaponry, humanitarian relief supplies, parachute drops, etc.

The operation of system shown in FIG. 3 is generally the same as the operation of the system described with respect to FIG. 1, except for the following differences. The antenna system with RF electronics 36 shown in FIG. 1 is replaced by dispenser with contents (e.g., payload) 68 (in FIG. 3). Power conversion assembly 44 of second module 22 is connected to and is configured to receive power from vehicle power supply unit 70. In one embodiment, power for dispenser 68 is supplied by power conversion assembly 40. In one embodiment, power conversion assembly 40 is configured to receive power from power conversion assembly 44 of second module 22 and to supply power to dispenser 68 and amplifier 38. In another embodiment, dispenser 68 and amplifier 38 may be powered by a battery system.

As shown in FIG. 3, first magnet arrangement 20 includes two magnet members 20A and 20B and second magnet arrangement 26 includes two magnet members 26A and 26B. Second magnet arrangement 26 includes a plurality of high permeability iron members 72 disposed around magnet members 26A and 26B so as to provide magnetic flux path for magnet members 26A and 26B.

The system in FIG. 3 includes current pulse generator 74. Current pulse generator 74 is arranged to supply with current pulses of opposite current direction in an alternating fashion to first winding 76 and secondary winding 78. Current pulse generator 74 is connected to connections *76a*, *76b* of first winding 76 and to connections *78a*, *78b* of secondary winding 78. Each current pulse generates a magnetic field in the magnetization windings 76 and 86 and high permeability iron members 72 so that high permeability iron members 72 either attract or repel two magnet members 20A and 20B of first magnet arrangement 20. When iron members 72 are configured to attract two magnet members 20A and 20B of first magnet arrangement 20, dispenser (e.g., payload) 68 remains attached to external surface 18 of vehicle 14. When dispenser (e.g., payload) 68 is to be released or dropped off from external surface 18 of vehicle 14, current pulse generator 74 is operated such that iron members 72 are configured to repel two magnet members 20A and 20B of first magnet arrangement 20.

In one embodiment, pulsing high permeability iron members 72 using current pulse generator 74 cancels the magnet force of first magnet arrangement 20 momentarily so that dispenser (e.g., payload) 68 is released or dropped off from external surface 18 of vehicle 14. First magnet arrangement 20 is used to prevent premature release or drop off of dispenser (e.g., payload) 68 from external surface 18 of vehicle 14 in case of a power loss. In another embodiment, if early detachment of the externally held object is acceptable, then electromagnets only may be used.

The present disclosure, thus, provides a quick equipment installation that does not require modifications to the aircraft skin or structure. For example, the equipment installation performed in accordance with embodiments of the present disclosure does not require any penetrations through the skin of the aircraft, and any post mission repairs or repainting/touchup. In addition, the performance of the equipment installation performed in accordance with embodiment of the present disclosure is comparable to conventional equipment installation methods.

The present disclosure provides a missionized aircraft both for commercial and military applications. For example, such aircraft provides commercial applications such as natural disaster aid, border patrol, drug interdiction, etc and provides military applications such as persistent wide area surveillance, irregular warfare support, etc.

The present disclosure thus provides rapid reconfiguration of an aircraft for special mission applications. The system of the present disclosure may be used in Intelligence, Surveillance, Reconnaissance (ISR) and/or Quick Reaction Capability (QRC) airborne platforms. The equipment installation technique of the present disclosure may be beneficial in an irregular warfare environment where the mission varies over time. Using the equipment installation of the present disclosure, any aircraft may be readily modified for a number of missions by creating different combinations of equipment to be installed. The present disclosure, thus, provides versatility by modifying a single aircraft for a number of missions (i.e., as opposed to having different types of aircraft for different missions) and flexibility to cater to changing mission needs. That is, the aircraft would benefit from the ability to rapidly reconfigure the mission suite as the need arises.

The equipment installation of the present disclosure allows an aircraft to be missionized and de-missionized easily, and eliminates need for specially qualified crews to modify aircraft structure/skin. The equipment installation of the present disclosure may be performed overnight without using any power tools.

Also, the equipment installation method of the present disclosure significantly reduces time and cost incurred during co-site testing of the equipment. Co-site generally refers to collocation of electronic equipment on the same vehicle, station, or base. The electronic equipment so located may often be subjected to interference because of its proximity to other equipment. The system of the present disclosure may be used purely as an integration tool for validation of Co-Site analyses, with minimum impact to the aircraft or test vehicle. This could reduce the mission aircraft design phase by four to six months. The installation method of the present disclosure provides the ability to relocate, fly and test the equipment without causing permanent changes (i.e., any cutting of the skin, and subsequent patching) to the aircraft's structure. During co-site testing, quick release equipment (e.g., an antenna) is be attached to aircraft to test co-site and may be repositioned without modifying aircraft until a position is validated and a permanent antenna is installed. The present disclosure also reduces wear and tear on test bed platforms that are commonly used to evaluate new concepts and configurations.

The quick install modular equipment described in the present disclosure may transfer power and data in, for example, border protection applications, disaster recovery applications, and search and rescue applications. It may also be used in any other applications where it is important to quickly upgrade communications capability (or to quickly add externally mounted electronics) to a vehicle.

Although the present disclosure has been described above in relation to an aircraft, it should be appreciated that the present disclosure can also be used for other vehicles such as land vehicles (e.g., jeeps, trains, tanks, etc) or marine vehicles (e.g., ships, boats, etc) that include non-ferrous skin.

Although the present disclosure has been described in detail in relation to vehicles, it should be appreciated that the present disclosure can also be used for other structures such as walls of temporary structures/dwellings.

This present disclosure saves time and money during quick reaction modifications. This also allows for quick restoration of a modified vehicle or structure without physical damage to the skin. As a secondary effect, it will demonstrate our ability to understand and deal with challenges of unobtrusive and noninvasive aircraft modifications. This present disclosure specifically allows rapid repositioning of an antenna, for example.

Embodiments of this disclosure may also find application in prototyping or structural analysis of more permanent structures. For example, where a number of alternate positions for a particular piece of equipment are available and wind tunnel or other testing is to be performed, the equipment may be easily moved between positions to determine the effects of moving it on drag, radar cross-section, structural strength or other aspects of interest.

Although the present disclosure has been described in detail for the purpose of illustration, it is to be understood that such detail is solely for that purpose and that the inventive concept is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment may be combined with one or more features of any other embodiment.

What is claimed is:

1. A system for attaching a device to an exterior of a vehicle, subsequently operating the device and transferring electrical power, data signals or both from an interior of the vehicle to the device on the exterior of the vehicle without skin penetrations or damage, the system comprising:

a first module suitable for disposition on an external surface of the vehicle;

a first magnet arrangement attached to the first module, the first magnet arrangement configured to be adjacent to the external surface of the vehicle;

a second module suitable for disposition on an internal surface of the vehicle; and a second magnet arrangement attached to the second module, the second magnet arrangement configured to be adjacent to the internal surface of the vehicle;

wherein the first magnet arrangement and the second magnet arrangement are selected in combination to provide sufficient magnetic attraction therebetween to maintain the first module at a fixed position on the external surface of the vehicle by overcoming an air load force when the vehicle is in motion, wherein at least a portion of a skin of the vehicle is made of a non-ferrous material;

a first transducer coupled to the first module, the first transducer including at least one of a piezoelectric transducer or a magnetic transducer and positioned on the external surface of the vehicle; and a second transducer coupled to the second module, the second transducer including at least one of a piezoelectric transducer or a magnetic transducer and positioned on the internal surface of the vehicle;

wherein each of the first transducer and the second transducer is configured to deform the skin of the vehicle and to convert a deformation of the skin into electrical energy, thereby providing a bidirectional signaling path between the first transducer and the second transducer for transferring electrical power.

2. The system of claim 1, further comprising a first non-slip pad member disposed between a bottom surface of the first magnet member and the external surface of the vehicle to provide an improved coefficient of friction therebetween, wherein the coefficient of friction in combination with magnetic attraction maintains the first module at the fixed position on the external surface of the vehicle by overcoming the air load force when the vehicle is in motion.

3. The system of claim 2, further comprising a second non-slip pad member disposed between a bottom surface of the second magnet member and the internal surface of the vehicle to provide an improved coefficient of friction therebetween, wherein the coefficient of friction in combination with magnetic attraction maintains the second module at a fixed position on the internal surface of the vehicle when the vehicle is in motion.

4. The system of claim 2, further comprising a release mechanism configured to cancel out magnetic attraction between the first magnet arrangement and the second magnet arrangement so as to detach the first and the second modules from the vehicle.

5. The system of claim 4, wherein the release mechanism is configured to rotate one of the first magnet arrangement and the second magnet arrangement to a position in which the one of the first magnet arrangement and the second magnet arrangement is positioned to repel the other of the first magnet arrangement and the second magnet arrangement.

6. The system of claim 4, wherein the release mechanism comprises a mechanical cam member configured to separate the first magnet arrangement from the second magnet arrangement so as to detach the first and the second modules from the vehicle.

7. The system of claim 4, wherein the release mechanism comprises a bucking magnet configured to cancel magnetic force of at least one of the first magnet arrangement and the second magnet arrangement so as to detach the first and the second modules from the vehicle.

8. The system of claim 1, wherein at least one of the first magnet arrangement and the second magnet arrangement comprises a permanent magnet.

9. The system of claim 8, further comprising a keeper arranged with at least one of the first magnet arrangement and the second magnet arrangement to enhance a strength of at least one of the first magnet arrangement and the second magnet arrangement by directing respective magnetic flux thereof.

10. The system of claim 1, wherein at least one of the first magnet arrangement and the second magnet arrangement comprises ferromagnetic material.

11. The system of claim 1, wherein at least one of the first magnet arrangement and the second magnet arrangement comprises an electromagnet configured to implement a release mechanism.

12. The system of claim 1, wherein at least one of the first magnet arrangement and the second magnet arrangement comprises a plurality of magnet members that are arranged in an alternating manner to receive keepers therebetween so as to enhance magnetic flux thereof.

13. The system of claim 12, wherein the plurality of magnet members are either arranged such that opposite magnetic poles of adjacent magnet members are facing each other or arranged such that like magnetic poles of adjacent magnet members are facing each other.

14. The system of claim 12, wherein the second magnet arrangement further comprises a plurality of permeable iron members disposed around the magnet members so as to provide a magnetic flux path for permanent magnets.

15. The system of claim 1, further comprising an enclosure secured to the external surface of the vehicle; a seal member to ensure a substantially airtight seal between the enclosure and the vehicle; and an air supply system configured to provide a cushion of air between a bottom surface of the module and the external surface of the vehicle to reduce a magnetic attraction therebetween and thereby separate the module from the vehicle so as to enable movement and positioning of the module at a desired location on the external surface of the vehicle without damaging the external surface of the vehicle.

16. The system of claim 15, wherein the desired location is a location at which a peak in signal strength of the data signals, the electrical power or both is obtained.

17. The system of claim 1, further comprising a battery operatively connected to the first module so as to operate the first module at a peak power level.

18. The system of claim 15, wherein the enclosure comprises an aluminum material.

19. The system of claim 15, wherein the enclosure comprises a composite material.

20. A method for aligning, moving and removing a magnetically attached module with respect to an external surface of a non-ferrous vehicle, the method comprising:

providing a transducer coupled to the magnetically attached module, the first transducer including at least one of a piezoelectric transducer or a magnetic transducer and positioned on the external surface of the non-ferrous vehicle, the transducer configured to deform the external surface of the vehicle and to convert a deformation of the external surface of the vehicle into electrical energy;

providing a cushion of air between a bottom surface of the magnetically attached module and the external surface of the vehicle to reduce magnetic force and thereby separate the magnetically attached module and the transducer from the vehicle; and using the cushion of air to move and position the magnetically attached module and the transducer at a desired location on the external surface of the vehicle without damaging the external surface of the vehicle.

21. A system for attaching a device to an exterior of a vehicle, subsequently operating the device and transferring electrical power, data or both from an interior of the vehicle to the device on the exterior of the vehicle, the system comprising:

a first module suitable for disposition on an external surface of the vehicle;

a first magnet arrangement attached to the first module, the first magnet arrangement configured to be adjacent to the external surface of the vehicle;

a second module suitable for disposition on an internal surface of the vehicle; and a second magnet arrangement attached to the second module, the second magnet arrangement configured to be adjacent to the internal surface of the vehicle;

wherein the first magnet arrangement and the second magnet arrangement are selected in combination to provide sufficient magnetic attraction therebetween to maintain the first module at a fixed position on the external surface of the vehicle by overcoming an air load force when the vehicle is in motion;

a first transducer coupled to the first module, the first transducer including at least one of a piezoelectric transducer or a magnetic transducer and positioned on the external surface of the vehicle; and a second transducer coupled to the second module, the second transducer including at least one of a piezoelectric transducer or a magnetic transducer and positioned on the internal surface of the vehicle;

wherein each of the first transducer and the second transducer is configured to deform the internal and external surfaces of the vehicle and to convert a deformation of the internal or the external surface of the vehicle into electrical energy, thereby providing a bidirectional signaling path between the first transducer and the second transducer for transferring electrical power;

wherein at least a portion of vehicle skin is made of a non-ferrous material, wherein the non-ferrous skin of the vehicle includes a passage arranged to receive a conductor therethrough, the conductor being configured to provide a secondary bidirectional path between the first module and the second module for transfer of data, electrical power or both.

22. The system of claim 21, wherein the secondary bidirectional path is configured to increase data transfer rate between the first module and the second module.

23. The system of claim 21, wherein the conductor includes an insulated wire.

24. The system of claim 1, further comprising an enclosure secured to the external surface of the vehicle; a seal member to ensure a substantially airtight seal between the enclosure and the vehicle; and an air supply system configured to provide a cushion of air between a bottom surface of the module and the external surface of the vehicle to reduce a magnetic attraction therebetween and thereby separate the module from the vehicle so as to enable removal of the module from the external surface of the vehicle.

25. The system of claim 1, wherein a maximum amplitude of the deformations of the internal and external surfaces of the vehicle is less than an elastic limit of the internal and external surfaces of the vehicle.

* * * * *